US012757228B2

(12) United States Patent
Lin

(10) Patent No.: US 12,757,228 B2
(45) Date of Patent: Oct. 6, 2026

(54) METHOD FOR SELECTING TIME-FREQUENCY RESOURCES INTENDED TO BE USED BY A RECEIVER EQUIPMENT BELONGING TO A BROADCAST GROUP FOR THE BROADCASTING OF MESSAGES, CORRESPONDING DEVICES AND COMPUTER PROGRAMS

(71) Applicant: Orange, Issy-les-Moulineaux (FR)

(72) Inventor: Hao Lin, Chatillon Cedex (FR)

(73) Assignee: Orange, Issy-les-Moulineaux (FR)

(*) Notice: Subject to any disclaimer, the term of this patent is extended or adjusted under 35 U.S.C. 154(b) by 428 days.

(21) Appl. No.: 17/436,405

(22) PCT Filed: Mar. 2, 2020

(86) PCT No.: PCT/FR2020/050412
§ 371 (c)(1),
(2) Date: Sep. 30, 2021

(87) PCT Pub. No.: WO2020/178514
PCT Pub. Date: Sep. 10, 2020

(65) Prior Publication Data

US 2022/0150870 A1 May 12, 2022

(30) Foreign Application Priority Data

Mar. 5, 2019 (FR) ....................................... 1902247

(51) Int. Cl.
*H04W 72/30* (2023.01)
*H04W 72/02* (2009.01)
(Continued)

(52) U.S. Cl.
CPC ........... *H04W 72/30* (2023.01); *H04W 72/02* (2013.01); *H04W 72/0446* (2013.01); *H04W 72/0453* (2013.01)

(58) Field of Classification Search
CPC .......... H04L 1/08; H04L 1/1854; H04W 4/40; H04W 72/02; H04W 72/20; H04W 72/23; H04W 72/51; H04W 72/542
(Continued)

(56) References Cited

U.S. PATENT DOCUMENTS

2015/0327180 A1* 11/2015 Ryu .......................... H04L 1/08 370/329
2022/0007403 A1* 1/2022 Li ......................... H04W 72/20
2022/0022167 A1* 1/2022 Jha ...................... H04W 72/542

FOREIGN PATENT DOCUMENTS

WO WO 2019/022480 A1 1/2019
WO WO-2020033622 A1 * 2/2020 ........... H04L 1/1854

OTHER PUBLICATIONS

Vukadinovic Vladimir et al., "3GPP C-V2X and IEEE 802.11p for Vehicle-to-Vehicle communications in highway platooning scenarios" Ad Hoc Networks, Elsevier, Amsterdam, NL, vol. 74, Mar. 15, 2018, pp. 17-29.
(Continued)

*Primary Examiner* — Harun Chowdhury
(74) *Attorney, Agent, or Firm* — Knobbe, Martens, Olson & Bear, LLP

(57) ABSTRACT

In a vehicle to anything environment, in order to allow the broadcasting of periodic messages, the emitter equipment regularly verifies whether time-frequency resources of a radio signal are used or not. When the emitter equipment detects an available time-frequency resource, it selects it and uses it to broadcast its messages. The duration necessary for the emitter equipment to listen to all the time-frequency resources is approximately one second. Such a listening
(Continued)

duration represents a disadvantage for services requiring a short latency, such as services requiring the broadcasting of aperiodic messages. The solution allows an emitter equipment to select a time-frequency resource at any moment according to its needs without having to regularly verify whether or not time-frequency resources are used to broadcast data. Thus, the latency is greatly reduced.

16 Claims, 3 Drawing Sheets

(51) Int. Cl.
*H04W 72/0446* (2023.01)
*H04W 72/0453* (2023.01)

(58) Field of Classification Search
USPC .......................................... 370/254, 329, 350
See application file for complete search history.

(56) References Cited

OTHER PUBLICATIONS

International Search Report for International Application No. PCT/FR2020/050412, mailed on Jun. 19, 2020.
Written Opinion of the International Searching Authority for International Application No. PCT/FR2020/050412, mailed on Jun. 19, 2020.

* cited by examiner

| | | | | | | | |
|---|---|---|---|---|---|---|---|
| 1 | 2 | 3 | 4 | 5 | 6 | 7 | 8 |
| 9 | 10 | 11 | 12 | 13 | 14 | 15 | 16 |

| T1 | L1 |
|---|---|
| (1.2) | 0 |
| (1.3) | 1 |
| (1.4) | 2 |
| (1.5) | 3 |
| (1.6) | 4 |
| (1.7) | 5 |
| (1.8) | 6 |
| (1.10) | 7 |
| (1.11) | 8 |
| (1.12) | 9 |
| (1.13) | 10 |
| (1.14) | 11 |
| (1.15) | 12 |
| (1.16) | 13 |

Tx - Rx1-Rx6

METHOD FOR SELECTING TIME-FREQUENCY RESOURCES INTENDED TO BE USED BY A RECEIVER EQUIPMENT BELONGING TO A BROADCAST GROUP FOR THE BROADCASTING OF MESSAGES, CORRESPONDING DEVICES AND COMPUTER PROGRAMS

CROSS-REFERENCE TO RELATED APPLICATIONS

This application is filed under 35 U.S.C. § 371 as the U.S. National Phase of Application No. PCT/FR2020/050412 entitled "METHOD FOR SELECTING TIME-FREQUENCY RESOURCES INTENDED TO BE USED BY A RECEIVER DEVICE BELONGING TO A BROADCAST GROUP FOR BROADCASTING MESSAGES, CORRESPONDING APPARATUSES AND COMPUTER PROGRAMS" and filed Mar. 2, 2020, and which claims priority to FR 1902247 filed Mar. 5, 2019, each of which is incorporated by reference in its entirety.

BACKGROUND

Field

The field of the development is that of broadcasting data in a group of user equipment such as mobile terminals. More precisely, the development relates to the field of V2X (Vehicle to anything), which relates to the broadcasting of data between a user equipment on board a vehicle and at least another user equipment belonging to the broadcasting group of the user equipment on board the vehicle.

Description of the Related Technology

The broadcasting of data in the context of V2X involves a transfer of information from a communication equipment on board a vehicle to at least one other communication equipment associated with or on board an entity capable of affecting the vehicle, and vice versa. V2X defines a vehicle communication system integrating other more specific types of communication, such as V21 (vehicle to infrastructure), V2N (vehicle to network), V2V (vehicle to vehicle), V2P (vehicle to pedestrian), etc.

Such a communication mode is in particular of interest in the context of a grouping of vehicles into platoons (platooningl), or a road convoy circulating in an automated highway system.

Platoons of vehicles allow to shorten the distances between the vehicles forming them via V2X communication. This capability allows for example the vehicles of the platoon to accelerate or break in unison. Thus, a platoon of electronically chained vehicles would move forward as a single block.

A first communication equipment on board a first vehicle is an emitter equipment broadcasting data to other receiver equipments on board other vehicles. The emitter equipment broadcasts data through a communication channel called "sidelink" or SL in the specifications of the 3GPP RAN (Third Generation Partnership Project Radio Access Network).

The emitter equipment periodically broadcasts messages of the CAM (Cooperative Awareness Message) type in order to maintain the various vehicles forming the platoon informed, for example, of the position of the vehicles or of their state.

In order to be able to broadcast such CAM messages, the emitter equipment regularly verifies whether time-frequency resources of a radio signal used to broadcast the data through a transmission channel are used to broadcast data or not. Once the emitter equipment has detected one or more available time-frequency resources, it selects them and uses them to broadcast CAM messages. Thus, the emitter equipment periodically broadcasts CAM messages by using each time the same time-frequency resources that it selected. A counter is decremented upon each broadcast of a CAM message by the emitter equipment so that when the counter is at zero, the emitter equipment frees the selected time-frequency resources and verifies once again whether time-frequency resources of a radio signal used to broadcast the data through a transmission channel are used to broadcast data or not.

The duration necessary for the emitter equipment to listen to all the time-frequency resources is approximately one second.

Such a listening duration represents a disadvantage for services requiring a short latency, such as services requiring the broadcasting of aperiodic messages.

There is therefore a need for a solution for broadcasting data between a emitter equipment and receiver equipment belonging to the same broadcasting group not having all or a part of the aforementioned disadvantages.

SUMMARY OF CERTAIN INVENTIVE ASPECTS

The development meets this need by proposing a method for broadcasting at least one message in a broadcasting group comprising a plurality of receiver equipments and a emitter equipment, the broadcasting method being implemented by said emitter equipment and comprising the following steps of:

- receiving a first message emitted by a base station of a radio communication network to which all of the equipments belonging to the broadcasting group are attached, comprising parameters identifying time-frequency resources of a pool of time-frequency resources to be used to broadcast said message,
- selecting a first time-frequency resource in said pool of time-frequency resources,
- selecting at least a second time-frequency resource in at least one subset of the time-frequency resources of said pool of time-frequency resources,
- broadcasting said message to the receiver equipments of the broadcasting group, a first time by using the first time-frequency resource selected and at least a second time by using the second time-frequency resource selected.

Such a solution allows an emitter equipment to select a time-frequency resource at any moment according to its needs without having to regularly verify whether time-frequency resources of a radio signal used to broadcast the data through a transmission channel are used to broadcast data or not. Thus, the latency is greatly reduced.

This is because the base station to which all the equipments belonging to the same broadcasting group are attached divides a pool of time-frequency resources into a determined number of time-frequency resources. The time-frequency resources of this pool of time-frequency resources can thus be chosen by the emitter equipment as needed. If the emitter equipment chooses a time-frequency resource that is already used, it suffices for it to choose another one in the pool of time-frequency resources.

The equipments belonging to the broadcasting group are equipments that communicate with each other in half-duplex mode. In other words, the same equipment of the broadcasting group cannot simultaneously receive data emitted by another equipment of the broadcasting group and emit data to the other equipment of the broadcasting group.

In order to take into account this specificity of the equipments of the broadcasting group, the emitter equipment selects at least two time-frequency resources in order to broadcast the message in each of them. This allows to limit the risk of the message broadcast by the emitter equipment not being received by receiver equipments that use one of the selected time-frequency resources to also broadcast a message in the broadcasting group.

In a first alternative embodiment of the broadcasting method, since a time-frequency resource is identified by an instant/frequency pair, said subset of the time-frequency resources comprises the first time-frequency resource and at least a second time-frequency resource identified by an instant distinct from an instant identifying the first time-frequency resource selected.

In this first alternative embodiment, the base station divides the pool of time-frequency resources into subsets of time-frequency resources. Each subset of time-frequency resources comprises at least two time-frequency resources. The time-frequency resources forming a subset of time-frequency resources can share the same frequency but not the same instant. This constraint is because the equipments belonging to the broadcasting group are equipments that communicate with each other in half-duplex mode. By selecting the first time-frequency resource, the emitter equipment is forced to select the other time-frequency resources in the same subset of time-frequency resources as the one to which the first time-frequency resource identified belongs.

In a second alternative embodiment of the broadcasting method, since a time-frequency resource is identified by an instant/frequency pair, said subset of time-frequency resources comprises at least a second time-frequency resource identified by an instant distinct from an instant identifying the first time-frequency resource selected.

In this second alternative embodiment, the subset of time-frequency resources comprises all the time-frequency resources of the pool of time-frequency resources except for the time-frequency resource selected and time-frequency resources identified by the same instant as the time-frequency resource selected.

By providing greater flexibility in the selection of the time-frequency resources, this alternative embodiment allows to reduce the risk of collision between equipments belonging to the broadcasting group. In other words, this second alternative embodiment allows to reduce the risk of two equipments belonging to the same broadcasting group selecting the same time-frequency resource at the same moment.

In a third alternative embodiment of the broadcasting method, the message broadcast to the receiver equipments of the broadcasting group comprises information relative to the time-frequency resources used for the broadcasting of said message and data intended to be processed by the receiver equipments of the broadcasting group.

This allows the receiver equipments of the broadcasting group to identify the time-frequency resources that are of interest to them.

In a fourth alternative embodiment of the broadcasting method, the information relative to the time-frequency resources used for the broadcasting of said message is identical during the first and the second broadcasting of said message and comprises a string of bits identifying the time-frequency resources of said pool of time-frequency resources, the first time-frequency resource and the second time-frequency resource selected are represented in said string of bits by a bit equal to 1 and the other time-frequency resources by a bit equal to 0.

In this fourth alternative embodiment the receiver equipments simply and quickly identify what are the time-frequency resources used for the broadcasting of the message by the emitter equipment. In this alternative embodiment, the receiver equipments can identify starting from the first broadcasting of the message which time-frequency resource is used for the second broadcasting of the message by the emitter equipment so as to be able to process the data received during the two broadcastings of the message conjointly.

In a fifth alternative embodiment of the broadcasting method, since the information relative to the time-frequency resources used for the broadcasting of said message is distinct during the first and the second broadcasting of said message, the information relative to the time-frequency resources comprised in the message during the first broadcasting comprises an index identifying a first pair consisting of the first time-frequency resource and the second time-frequency resource selected, and the information relative to the time-frequency resources comprised in the message during the second broadcasting comprises an index identifying a second pair consisting of the second time-frequency resource and the first time-frequency resource selected.

In this fifth alternative embodiment, the emitter equipment identifies the time-frequency resources used for the broadcasting of the message via an index pointing to a table grouping together the various combinations of time-frequency resources possible.

The transmission of an index identifying the time-frequency resources used allows to limit the volume of the control data transmitted by the emitter equipment to the receiver equipments given that the tables grouping together the various combinations of time-frequency resources are transmitted to the equipments belonging to the broadcasting group by the base station.

The development also relates to a method for receiving at least one message broadcast in a broadcasting group comprising a plurality of receiver equipments and a emitter equipment, the reception method being implemented by at least one receiver equipment and comprising the following steps of:

- receiving a first message emitted by a base station of a radio communication network to which all of the equipments belonging to the broadcasting group are attached, comprising parameters identifying time-frequency resources of a pool of time-frequency resources used during the broadcasting of said message,
- receiving, in a first time-frequency resource, said broadcast message,
- receiving, in a second time-frequency resource, said broadcast message,
- processing the data contained in the broadcast message, said processing of the data involving combining the data contained in the broadcast message and decoding the data thus combined.

Combining the data received during the various broadcastings of the message allows to reduce the signal-to-noise ratio and thus improve the quality of the signals received.

In a first alternative embodiment of the reception method, since the message broadcast to the receiver equipments of the broadcasting group comprises information relative to the time-frequency resources used for the broadcasting of said message, the method further comprises:

- a step of comparing the information relative to the time-frequency resources used for the broadcasting of said message,
- when the information relative to the time-frequency resources used for the broadcasting of said message received during the first broadcasting and during the second broadcasting corresponds, a step of combining the data contained in the message and received during the first broadcasting and during the second broadcasting of said message.

When, for a given reason, the information relative to the time-frequency resources used for the broadcasting of the message does not correspond, the data contained in the message is not combined and is processed as if it was comprised in two different messages.

In a second alternative embodiment of the reception method, the information relative to the time-frequency resources used for the broadcasting of said message is identical during the first and the second broadcasting of said message and comprises a string of bits identifying the time-frequency resources of said pool of time-frequency resources in which the first time-frequency resource and the second time-frequency resource selected are represented by a bit equal to 1 and the other time-frequency resources by a bit equal to 0.

In a third alternative embodiment of the reception method, since the information relative to the time-frequency resources used for the broadcasting of said message is distinct during the first and the second broadcasting of said message, the information relative to the time-frequency resources comprised in the message during the first broadcasting comprises an index identifying the first time-frequency resource and the second time-frequency resource selected, and the information relative to the time-frequency resources comprised in the message during the second broadcasting comprises an index identifying the second time-frequency resource and the first time-frequency resource selected.

The development also relates to a method for emitting at least a first message in a broadcasting pool comprising a plurality of receiver equipments and an emitter equipment, the emission method being implemented by a base station of a radio communication network to which all of the equipments belonging to the broadcasting group are attached and comprising the following steps of:

- dividing a pool of time-frequency resources into a plurality of time-frequency resources to be used for the broadcasting, by the emitter equipment, of at least a second message in said broadcasting group,
- emitting said first message comprising parameters identifying said time-frequency resources to be used for the broadcasting of said second message in said broadcasting group.

According to an alternative embodiment of the emission method forming the object of the development, since the parameters identifying the time-frequency resources comprised in the second message intended to be broadcast comprise an index identifying the time-frequency resources selected, the first message further comprises at least one lookup table allowing the identification of the time-frequency resources selected via said index.

The object of the development is also an emitter equipment capable of broadcasting at least one message to a plurality of receiver equipment belonging to a broadcasting group, the emitter equipment comprising means for:

- receiving a first message emitted by a base station of a radio communication network to which all of the equipments belonging to the broadcasting group are attached, comprising parameters identifying time-frequency resources of a pool of time-frequency resources to be used to broadcast said message,
- selecting a first time-frequency resource in said pool of time-frequency resources,
- selecting at least one second time-frequency resource in a subset of the time-frequency resources of said pool of time-frequency resources,
- broadcasting said message to the receiver equipments of the broadcasting group, a first time by using the first time-frequency resource selected and at least a second time by using the second time-frequency resource selected.

Another object of the development also relates to an equipment receiving at least one message broadcast in a broadcasting group comprising a plurality of receiver equipments and an emitter equipment, the receiver equipment comprising means for:

- receiving a first message emitted by a base station of a radio communication network to which all of the equipments belonging to the broadcasting group are attached, comprising parameters identifying time-frequency resources of a pool of time-frequency resources used during the broadcasting of said message,
- receiving, in a first time-frequency resource, said broadcast message,
- receiving, in a second time-frequency resource, said broadcast message,
- processing the data contained in the broadcast message, by combining the data contained in the broadcast message and by decoding the data thus combined.

The development also relates to a base station of a communication network to which a set of receiver equipments and a emitter equipment belonging to a broadcasting group are attached, said base station being capable of emitting at least one message in the broadcasting group and comprising means for:

- dividing a pool of time-frequency resources into a plurality of time-frequency resources to be used for the broadcasting, by the emitter equipment, of at least a first message in said broadcasting group,
- emitting said first message comprising parameters identifying said time-frequency resources in said broadcasting group.

Finally, the development relates to a computer program product comprising program code instructions for implementing a method as described above, when it is executed by a processor.

The development is also aimed at a recording support readable by a computer on which a computer program comprising program code instructions for the execution of the steps of the method according to the development as described above is recorded.

Such a recording support can be any entity or device capable of storing the program. For example, the support can include a storage medium, such as a ROM, for example a CD-ROM or a ROM of a microelectronic circuit, or a magnetic recording medium, for example a USB key or a hard disk.

Moreover, such a recording support can be a transmittable support such as an electric or optical signal, which can be delivered via an electric or optical cable, by radio or by other means, so that the computer program that it contains can be executed remotely. The program according to the development can be in particular downloaded over a network for example the Internet network.

Alternatively, the recording support can be an integrated circuit into which the program is incorporated, the circuit being adapted to execute or to be used in the execution of the aforementioned method forming the object of the development.

BRIEF DESCRIPTION OF THE DRAWINGS

Other goals, features and advantages of the development will be clearer upon reading the following description, given as a simple illustrative and non-limiting example, in relation to the drawings, among which.

DETAILED DESCRIPTION OF CERTAIN ILLUSTRATIVE EMBODIMENTS

The general principle of the development is based on the division of a pool of time-frequency resources used for the broadcasting of data in a broadcasting group comprising a plurality of receiver equipments and a emitter equipment in order to reduce the latency related to the selection, by the emitter equipment, of the time-frequency resources to be used to broadcast a message. In the rest of the document, examples of implementations of the solution forming the object of the development are described in relation to a V2X system, but the development can be applied in other contexts. More generally, the development can be applied in any broadcasting group or groupcast system for which it is of interest to reduce the latency.

Figure 1:
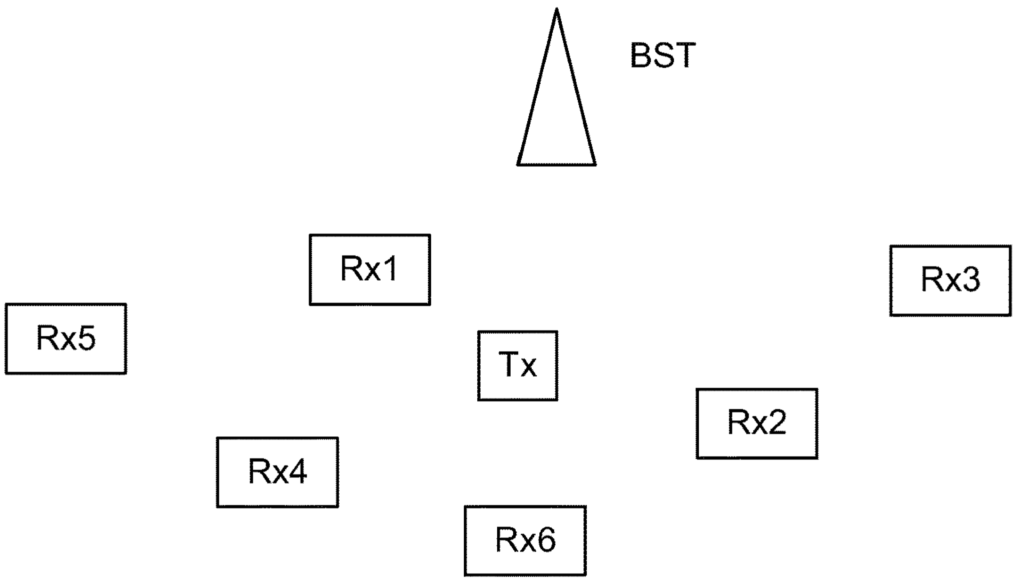
FIG. 1: this drawing shows a V2X system in which the development is implemented.

Hereinafter, in relation to [FIG. 1], a V2X system in which the development is implemented is presented.

Such a system comprises a base station BST, to which a plurality of user equipments Tx and Rx1-Rx6 are attached. The user equipments Tx and Rx1-Rx6 are for example mobile terminals on board vehicles.

The user equipments Tx and Rx1-Rx6 are attached to the base station BST and communicate directly and individually with it through a communication channel called "Uu" in the 3GPP RAN specifications.

The user equipments are divided into two categories: an emitter equipment Tx capable of broadcasting data and receiver equipments Rx1-Rx6 capable of receiving data broadcast by a emitter equipment Tx. In one embodiment of the development, the user equipments Tx and Rx1-Rx6 are capable of broadcasting and of receiving data according to the needs.

Figure 2:
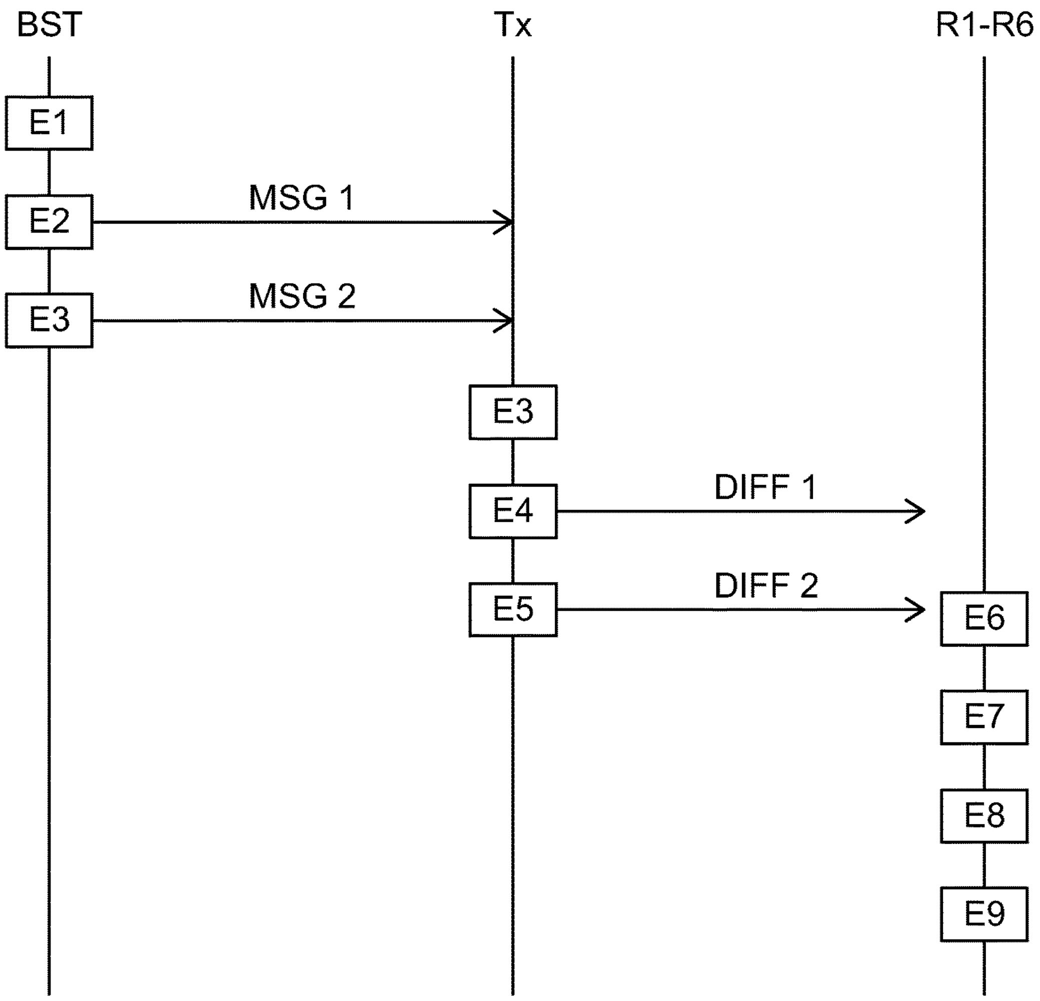
FIG. 2: this drawing shows a diagram of the exchanges occurring between the base station and the user equipments in a general embodiment of the development.

FIG. 2 shows a diagram of the exchanges occurring between the base station BST and the user equipments Tx and Rx1-Rx6 in a general embodiment of the development.

In a first step E1, the base station BST divides one or more pools of time-frequency resources of a radio signal carrying data through the communication channel SL into a plurality of time-frequency resources intended to be used by the various equipments Tx, Rx1-Rx6 in order to broadcast messages to each other. Each time-frequency resource is identified by an instant/frequency pair. In the rest of the document, the base station BST only makes a single pool of time-frequency resources available to the user equipments Tx, Rx1-Rx6. When several pools of resources are made available to the user equipments Tx, Rx1-Rx6 by the base station BST, the user equipments Tx, Rx1-Rx6 do not select the time-frequency resources that they use to broadcast messages in the broadcasting group in several pools of time-frequency resources; the time-frequency resources used for the broadcasting of the same message in the broadcasting group are selected in the same pool of time-frequency resources.

During a step E2, the base station BST emits a message MSG1 to the emitter equipment Tx. The message MSG1 comprises an identifier of the pool of time-frequency resources made available to the user equipments Tx, Rx1-Rx6.

During a step E3, the base station BST emits a message MSG2 to the receiver equipments Rx1-Rx6. The message MSG2 comprises the identifier of the pool of time-frequency resources made available to the user equipments Tx, Rx1-Rx6.

The data exchanged between the base station BST and the user equipments Tx and Rx1-Rx6 during steps E1 and E2 is transmitted through the communication channel Uu.

In a step E3, the emitter equipment Tx randomly selects at least one first time-frequency resource R1 in the pool of time-frequency resources identified in the message MSG1 emitted by the base station BST. The time-frequency resource R1 or the time-frequency resources thus selected by the emitter equipment Tx are used for the broadcasting of data to the receiver equipment Rx1-Rx6.

Figure 3:
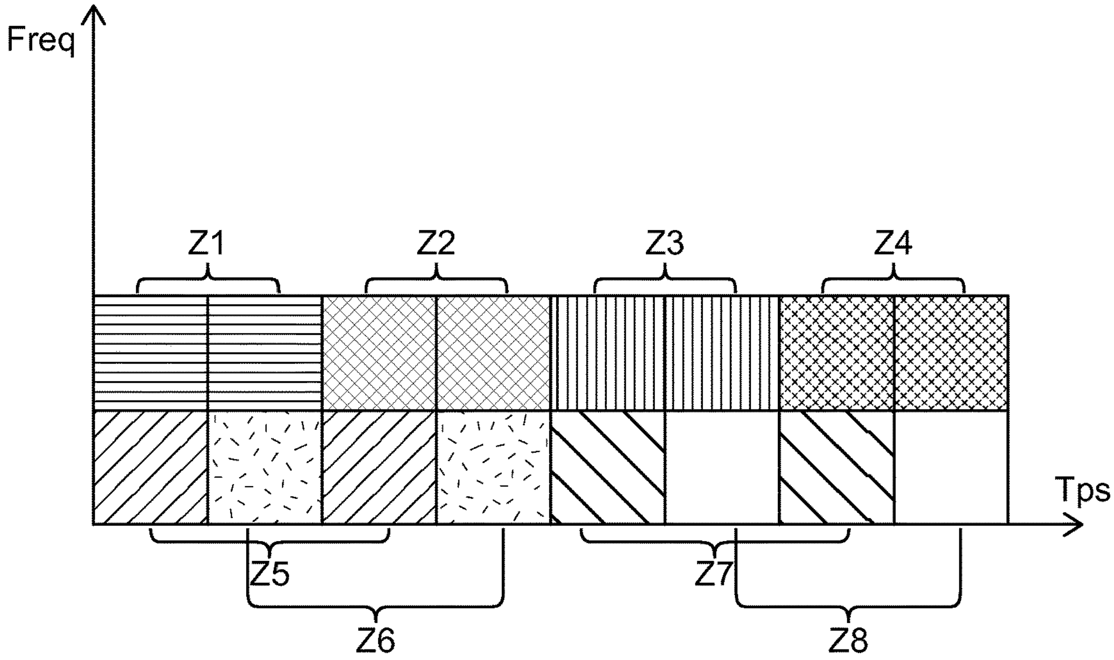
FIG. 3: this drawing shows an organization of the pool of time-frequency resources according to a first embodiment of the development.

In a first embodiment of the development, the base station BST groups together the time-frequency resources of the pool of time-frequency resources into a plurality of subsets, or zones of resources, each comprising N time-frequency resources, N being a natural number. Such an organization of the pool of time-frequency resources is shown in [FIG. 3]. In this figure, eight zones of resources Z1 to Z8 are shown, each of these zones comprising N=2 time-frequency resources. These eight zones of time-frequency resources Z1 to Z8 can have different patterns according to the manner in which the base station BST has organized the pool of time-frequency resources. By choosing the first time-frequency resource R1, the emitter equipment Tx is assigned at least one second time-frequency resource R2.

Thus, the zones Z1 to Z4 are formed into blocks, that is to say that the time-frequency resources forming them identified themselves by instants that follow each other directly, whereas the zones Z5 to Z6 are formed by interlaced time-frequency resources. During the division of the pool of time-frequency resources into zones of resources, the base station BST must respect a constraint according to which at least two of the N time-frequency resources forming the same zone of resources are identified by distinct instants. This constraint allows to take into account the specificity of the user equipments Tx, Rx1-Rx6 that are equipments communicating with each other in half-duplex mode.

Thus, by constraining at least two time-frequency resources of the same zone of resources to being identified by distinct instants, the base station ensures that regardless of the time-frequency resource selected by the emitter equipment Tx, the latter is sure to be able to receive data emitted by the receiver equipments Rx1-Rx6 since the latter can select in the pool of time-frequency resources only time-frequency resources being identified by distinct instants.

The risk of collision between two user equipmentx Tx, Rx1-Rx6, that is to say the risk of two user equipments Tx, RX1-RX6 selecting the same time-frequency resource, is calculated in the following manner: $P_c=1-\left(\prod_{i=0}^{M-1}(N-i)\right)/N^M$, where N is the total number of time-frequency resources, and M the number of user equipments Tx, Rx1-Rx6. In a first example in which N=8 and M=2, the probability of collision is 12.5%. In the case in which M=4, the probability of collision increases and is 59%. These values of probabilities of collision are related to the fact that the patterns of the zones of resources are predefined by the base station BST and cannot be modified.

In order to reduce the value of the probability of collision, in a second embodiment of the development, the base station BST authorizes the emitter equipment Tx to randomly select at least two time-frequency resources R1 and R2 in the pool of time-frequency resources with the sole condition that at least two of the time-frequency resources selected are identified by distinct instants. Such an organization of the pool of time-frequency resources is shown in [FIG. 4]. All of the time-frequency resources selected by the emitter equipment Tx thus form a zone of resources Z.

Figure 4:
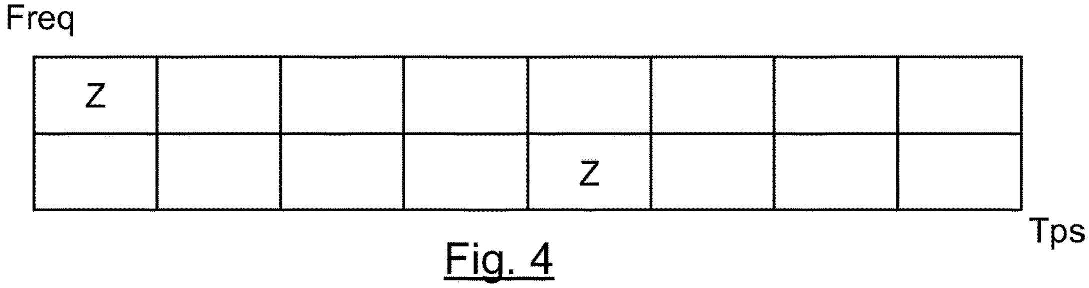
FIG. 4: this drawing shows a pool of time-frequency resources divided according to a second embodiment of the development.

The pool of time-frequency resources shown in [FIG. 4] consists of 16 time-frequency resources and a zone of resources comprises two time-frequency resources, there are therefore $C_{14}^{2}=104$ zones of resources possible. Indeed, it is considered that once the first time-frequency resource is selected from the 16 time-frequency resources of the pool of time-frequency resources, the second resource to be selected can only be selected from the 14 remaining time-frequency resources since the first resource selected cannot be selected again and no resource identified by the same instant as the first resource selected can be selected. In the case in which N=8 and M=4, the probability of collision goes from 59% in the first embodiment to 5.7% in this second embodiment.

In a step E4, the emitter equipment Tx broadcasts, by using the first time-frequency resource R1 selected, a message DIFF1 to the receiver equipments Rx1-Rx6. The message DIFF1 comprises control data and useful data or payload. The control data comprises in particular data relative to the modulation and to the encoding scheme applied to the useful data.

In a step E5, the emitter equipment Tx broadcasts, by using the second time-frequency resource R2 selected, a message DIFF2 to the receiver equipment Rx1-Rx6. The message DIFF2 comprises control data that is specific to it and the same useful data or payload as the useful data comprised in the message DIFF1. The control data comprises in particular data relative to the modulation and to the encoding scheme applied to the useful data.

In order to allow the receiver equipments Rx1-Rx6 to combine the data comprised in the two messages DIFF1 and DIFF2 and to thus reduce the signal-to-noise ratio and improve the quality of the signals received, the control data of the messages DIFF1 and DIFF2 further comprises information allowing to identify the time-frequency resources R1 and R2 used by the emitter equipment Tx to broadcast the message DIFF1 and a message DIFF2.

Figure 5:
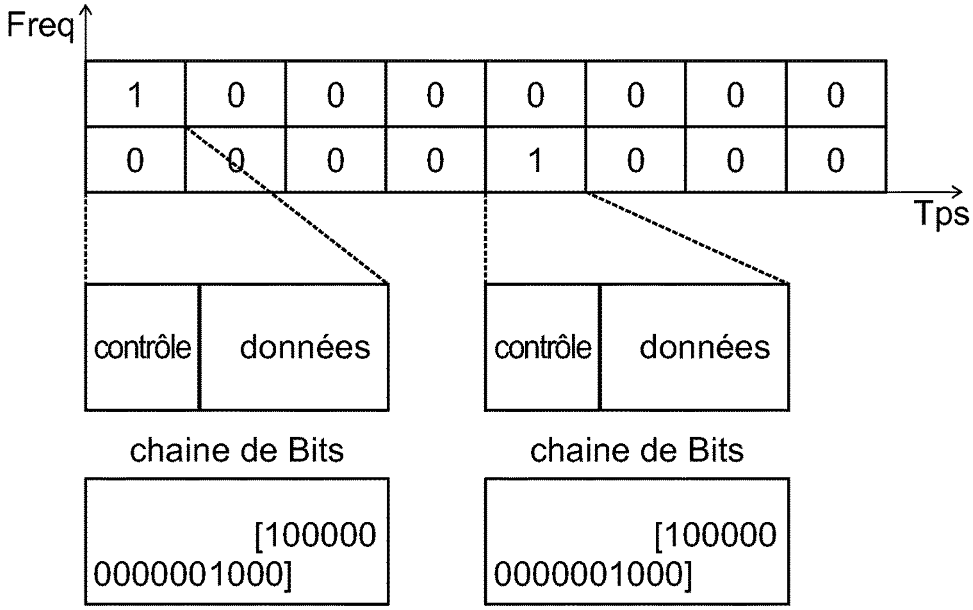
FIG. 5: this drawing shows a string of bits identifying the time-frequency resources selected by an emitter equipment.

In a first implementation, the information allowing to identify the time-frequency resources R1 and R2 consists of a string of bits identifying the time-frequency resources of the pool of time-frequency resources in which the first time-frequency resource R1 and the second time-frequency resource R2 selected are represented by a bit equal to 1 and the other time-frequency resources by a bit equal to 0. Such a string of bits is shown in [FIG. 5].

Figures 6, 7:
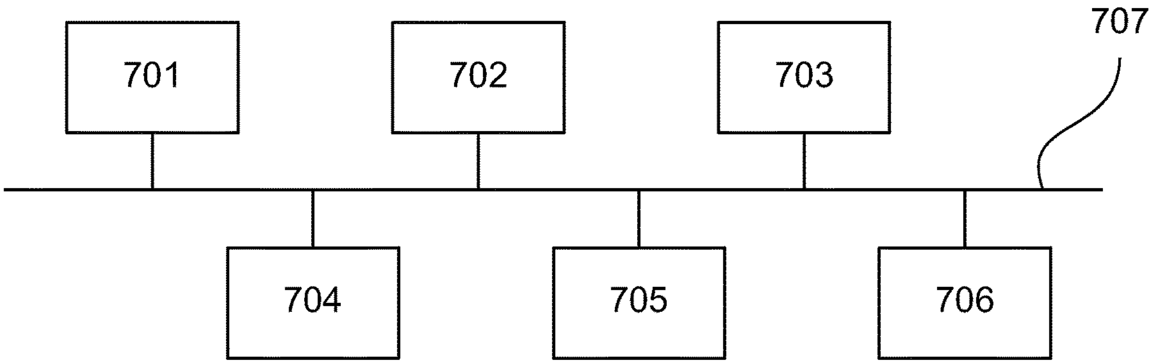
FIG. 6: this drawing shows a table of combinations of time-frequency resources selected by an emitter equipment and a list of associated indices.
FIG. 7: this drawing shows a user equipment according to an embodiment of the development.

In a second implementation shown in figure [FIG. 6], the information allowing to identify the time-frequency resources R1 and R2 consists of an index identifying the pair of time-frequency resources R1 and R2 selected by the emitter equipment Tx.

In this second implementation, a list of all the combinations of time-frequency resources possible is generated for each time-frequency resource. Thus, when the emitter equipment Tx selects the first time-frequency resource 1 of the pool of time-frequency resources as the first time-frequency resource R1, the 14 possible combinations of time-frequency resources are listed in the table T1 and each combination of time-frequency resources points to an index of an associated index list L1. In the example shown in [FIG. 6], the emitter equipment Tx selects the thirteenth time-frequency resource 13 of the pool of time-frequency resources as the second time-frequency resource R2.

In this example, the control data of the message DIFF1 comprises the index 10 of the index list L1 that allows the receiver equipments Rx1-Rx6 to identify the time-frequency resources R1 and R2 used by the emitter equipment Tx to broadcast the message DIFF1 and the message DIFF2.

The control data of the message DIFF2 comprises another of another index list in order to allow the identification of the time-frequency resources R1 and R2 used by the emitter equipment Tx to broadcast the message DIFF1 and the message DIFF2. Indeed, since the time-frequency resource used for the broadcasting of the message DIFF2 is the time-frequency resource R2, it is the combination of time-frequency resources (R2, R1) and thus the associated index in an index list associated with the combinations of time-frequency resources possible when the time-frequency resource considered is the thirteenth time-frequency resource of the pool of time-frequency resources that is transmitted with the control data.

The tables of combinations and the index lists are transmitted to the user equipments Tx, Rx1-Rx6 in the messages MSG1 and MSG2 emitted by the base station during steps E2 and E3.

This second implementation allows to limit the size of the control data by reducing the number of bits necessary to encode the information allowing to identify the time-frequency resources R1 and R2 used by the emitter equipment Tx.

In a step E6, upon reception of the message DIFF1, the receiver equipments Rx1-Rx6 identify in the control data the information allowing to identify the time-frequency resources R1 and R2 used by the emitter equipment Tx, either in the form of a bit string or in the form of an index.

In a step E7, upon reception of the message DIFF2, the receiver equipments Rx1-Rx6 identify in the control data the information allowing to identify the time-frequency resources R1 and R2 used by the emitter equipment Tx, either in the form of a bit string or in the form of an index.

In a step E8, the receiver equipments Rx1-Rx6 compare the information allowing to identify the time-frequency resources R1 and R2 used by the emitter equipment Tx extracted from the control data of the messages DIFF1 and DIFF2 in order to determine whether it corresponds. If the information allowing to identify the time-frequency resources R1 and R2 used by the emitter equipment Tx corresponds, then the receiver equipments Rx1-Rx6 combine the useful data received in the two messages DIFF1 and DIFF2 and decode the data thus combined in a step E9.

When the information allowing to identify the time-frequency resources R1 and R2 used by the emitter equipment Tx does not correspond, the useful data received in the two messages DIFF1 and DIFF2 is processed independently.

FIG. 7 shows a user equipments Tx or Rx1-Rx6 according to an embodiment of the development. Such a user equipments Tx or Rx1-Rx6 is capable of implementing the various embodiments of the method described in reference to FIGS. 2-6.

A user equipment Tx or Rx1-Rx6 can comprise at least one hardware processor 701, a storage unit 702, an input device 703, a display device 704, an interface 705, and at least one network interface 706 that are connected to each other through a bus 707. Of course, the elements forming the user equipment Tx or Rx1-Rx6 can be connected via a connection other than a bus.

The processor 701 controls the operations of the user equipment Tx or Rx1-Rx6. The storage unit 702 stores at least one program for the implementation of the method according to an embodiment of the development to be executed by the processor 701, and various data, such as parameters used for the calculations carried out by the processor 701, intermediate data of calculations carried out by the processor 701, etc. The processor 701 can be formed by any known and appropriate hardware or software, or by a combination of hardware and software. For example, the processor 701 can be formed by dedicated hardware such as a processing circuit, or by a programmable processing unit such as a central processing unit that executes a program stored in a memory of said processor.

The storage unit 702 can be formed by any appropriate means capable of storing the program or the programs and data in a manner readable by a computer. Examples of a storage unit 702 comprise non-transient storage supports readable by computer such as semiconductor memory devices, and magnetic, optical or magneto-optical recording supports loaded into a reading and writing unit.

The input device 703 can be formed by a keyboard, a pointing device such as a mouse to be used by a user to input commands. The display device 704 can also be formed by a display module, for example such as a graphical user interface or GUI.

The interface 705 provides an interface between the user equipment Tx or Rx1-Rx6 and another user equipment Tx or Rx1-Rx6 that is a member of the same broadcasting group.

At least one network interface 706 provides a connection between the user equipment Tx or Rx1-Rx6 and the base station BST via a radio connection.

The invention claimed is:

1. A method of broadcasting at least one second message in a broadcasting group comprising a plurality of receiver equipments and an emitter equipment, the second message comprising a payload to be processed by the receiver equipment, the broadcasting method being implemented by the emitter equipment and comprising:

receiving a first message emitted by a base station of a radio communication network to which all of the equipments belonging to the broadcasting group are attached, comprising parameters identifying time-frequency resources of a pool of time-frequency resources for broadcasting the second message;

selecting, in the pool of time-frequency resources, both a first time-frequency resource and at least one second time-frequency resource, the at least one second time-frequency resource being in a subset of the time-frequency resources of the pool of time-frequency resources, different in time from the first time-frequency resource;

subsequently to selecting both the first time-frequency resource and the at least one second time-frequency resource, a broadcasting of the second message by using both the first time-frequency resource selected and a broadcasting of the second message using the at least one second time-frequency resource selected, the broadcasting of the second message using the at least one second time-frequency resource being independent from any acknowledge receipt, from the receiver equipments, of the broadcasting of the second message by using the first time-frequency resource, each one of the broadcasting of the second message by using the first time-frequency resource selected and the broadcasting of the second message by using the at least one second time-frequency resource selected comprising the payload and control data, wherein the control data in each one of the broadcasting of the second message comprises information enabling to identify, independently from the information comprised in the control data of the other one broadcasting, both the first time-frequency resource selected and the at least one second time-frequency resource selected.

2. The broadcasting method according to claim 1, wherein a time-frequency resource is identified by an instant-frequency pair, the subset of the time-frequency resources further comprises at least the first time-frequency resource and the second time-frequency resource is identified by an instant distinct from an instant identifying the first time-frequency resource.

3. The broadcasting method according to claim 1, wherein a time-frequency resource is identified by an instant-frequency pair, the second time-frequency resource is identified by an instant distinct from an instant identifying the first time-frequency resource selected.

4. The broadcasting method according to claim 1, wherein the second message broadcast to the receiver equipments of the broadcasting group further comprises control data relative to the time-frequency resources used for the broadcasting of the second message and the payload intended to be processed by the receiver equipments of the broadcasting group.

5. The broadcasting method according to claim 4, wherein the control data relative to the time-frequency resources selected for the broadcasting of the second message is identical during the first and the second broadcasting of the second message and comprises a string of bits identifying the time-frequency resources of the pool of time-frequency resources, the first time-frequency resource and the second time-frequency resource selected are represented in the string of bits by a bit equal to 1 and the other time-frequency resources by a bit equal to 0.

6. The broadcasting method according to claim 4, wherein the control data relative to the time-frequency resources selected for the broadcasting of the second message is distinct during the first and the second broadcasting of the second message, the control data relative to the time-frequency resources comprised in the second message during the first broadcasting comprises an index identifying a first pair consisting of the first time-frequency resource and the second time-frequency resource selected, and the control data relative to the time-frequency resources comprised in the second message during the second broadcasting comprises an index identifying a second pair consisting of the second time-frequency resource and the first time-frequency resource selected.

7. A non-transitory computer storage medium, storing instructions of a computer program causing implementing the method according to claim 1, when the program is executed by a processor.

8. A reception method of receiving at least one broadcast second message comprising a payload in a broadcasting group comprising a plurality of receiver equipments and an emitter equipment, the reception method being implemented by one receiver equipment and comprising:

receiving a first message emitted by a base station of a radio communication network to which all of the equipments belonging to the broadcasting group are attached, comprising parameters identifying time-frequency resources of a pool of time-frequency resources that can be used during the broadcasting of the second message;

receiving, both in a first time-frequency resource used and in a second time-frequency resource used, the second message broadcast during a broadcasting, the second time-frequency resource being distinct in time from the first time-frequency resource used;

receiving the second message broadcast by using the second time-frequency resource being independent from any acknowledge receipt of the reception of the second message by using the first time-frequency resource, the second message comprising the payload and control data, wherein the control data in each one of the broadcasting of the second message comprises information enabling to identify, independently from the information comprised in the control data of the other one broadcasting, both the first time-frequency resource selected and the at least one second time-frequency resource selected; and processing the control data comprised in the broadcast second message both received in the first time-frequency resource and in the second time-frequency resource, by combining the useful data contained in the second message broadcast by using the first time-frequency resource and the useful data contained in the second message broadcast by using the second time-frequency resource and by decoding the useful data thus combined.

9. The reception method according to claim 8, the method further comprising:

comparing the control data relative to the time-frequency resources used for the broadcasting of the message, when the control data relative to the time-frequency resources used for the broadcasting of the second message received during the first broadcasting and during the second broadcasting correspond, the processing of the data involves combining the payload comprised in the second message received during the first broadcasting and during the second broadcasting of the second message and decoding the combined data.

10. The reception method according to claim 9, wherein the control data comprises a string of bits identifying the time-frequency resources of the pool, the first time-frequency resource and the second time-frequency resource used are represented in the string of bits by a bit equal to 1 and the other time-frequency resources by a bit equal to 0.

11. The reception method according to claim 8, the method further comprising:

comparing the control data relative to the time-frequency resources used for the broadcasting of the message, when the control data relative to the time-frequency resources used for the broadcasting of the second message received during the first broadcasting and during the second broadcasting is distinct, the payload comprised in the second message received during the first broadcasting and in the second message received during the second broadcasting are processed and decoded independently of each other.

12. A method of emitting at least a first message in a broadcasting group comprising a plurality of receiver equipments and an emitter equipment, the emission method being implemented by a base station of a radio communication network to which all of the equipments belonging to the broadcasting group are attached and comprising:

dividing a pool of time-frequency resources into a plurality of time-frequency resources for the broadcasting, by the emitter equipment, of at least a second message in the broadcasting group, the broadcasting using two distinct time frequency resources among the plurality of time-frequency resources, the broadcasting being performed using the two distinct time-frequency resources independently from any acknowledge receipt of reception of the second message by using one of the two distinct time-frequency resources, the two distinct time-frequency resource being different in time, and both the second message broadcast by using the two distinct time-frequency resources comprising a same payload and control data, wherein the control data in each one of the broadcasting of the second message comprises information enabling to identify, independently from the information comprised in the control data of the other one broadcasting, both two distinct time-frequency resources; and emitting the first message comprising parameters identifying the time-frequency resources in the broadcasting group.

13. The emission method according to claim 12, wherein the parameters identifying the time-frequency resources comprised in the second message comprise an index identifying the time-frequency resources selected for the broadcasting, the first message further comprises at least one lookup table allowing the identification of the time-frequency resources selected via the index.

14. An emitter equipment capable of broadcasting at least one second message comprising a payload to a plurality of receiver equipments belonging to a broadcasting group, the emitter equipment comprising at least one processor configured for:

receive a first message emitted by a base station of a radio communication network to which all of the equipments belonging to the broadcasting pool are attached, comprising parameters identifying time-frequency resources of a pool of time-frequency resources for broadcasting the second message;

select, in the pool of time-frequency resources, both a first time-frequency resource and at least one second time-frequency resource, the at least one second time-frequency resource being in a subset of the time-frequency resources of the pool of time-frequency resources, different in time from the first time-frequency resource;

subsequently to selecting both the first time-frequency resource and the at least one second time-frequency resource, broadcast the second message by using both the first time-frequency resource selected and the at least one second time-frequency resource selected, the broadcasting of the second message by using the at least one second time-frequency resource being independent from any acknowledge receipt, from the receiver equipments, of the broadcasting of the second message by using the first time-frequency resource, each one of the broadcasting of the second message by using the first time-frequency resource selected and the broadcasting of the second message by using the at least one second time-frequency resource selected comprising the payload and control data, wherein the control data in each one of the broadcasting of the second message comprises information enabling to identify, independently from the information comprised in the control data of the other one broadcasting, both the first time-frequency resource selected and the at least one second time-frequency resource selected.

15. A receiver equipment receiving at least one broadcast second message comprising a payload in a broadcasting group comprising a plurality of receiver equipments and an emitter equipment, the receiver equipment comprising at least one processor configured for:

receive a first message emitted by a base station of a radio communication network to which all of the equipments belonging to the broadcasting group are attached, comprising parameters identifying time-frequency resources of a pool of time-frequency resources that can be used during the broadcasting of the second message;

receive, both in a first time-frequency resource used and in a second time-frequency resource used, the second message broadcast during a broadcasting, the second time-frequency resource used being distinct in time from the first time-frequency resource used;

receiving the second message broadcast by using the second time-frequency resource being independent from any acknowledge receipt of the reception of the second message by using the first time-frequency resource, the second message comprising the payload and control data, wherein the control data in each one of the broadcasting of the second message comprises information enabling to identify, independently from the information comprised in the control data of the other one broadcasting, both the first time-frequency resource selected and the at least one second time-frequency resource selected; and process the control data comprised in the broadcast second message both received in the first time-frequency resource and in the second time-frequency resource, by combining the useful data contained in the second message broadcast by using the first time-frequency resource and the useful data contained in the second message broadcast by using the second time-frequency resource and by decoding the useful data thus combined.

16. A base station of a radio communication network to which a set of receiver equipments and an emitter equipment belonging to a broadcasting group are attached, the base station being capable of emitting at least a first message in the broadcasting group and comprising at least one processor configured for:

dividing a pool of time-frequency resources into a plurality of time-frequency resources for the broadcasting, by the emitter equipment, of at least a second message in the broadcasting group, the broadcasting using two distinct time frequency resources among the plurality of time-frequency resources, the broadcasting being performed using the two distinct time-frequency resources independently from any acknowledge receipt of reception of the second message by using one of the two distinct time-frequency resources, the two distinct time-frequency resource being different in time, both the second message broadcast by using the two distinct time-frequency resources comprising a same payload and control data, wherein the control data in each one of the broadcasting of the second message comprises information enabling to identify, independently from the information comprised in the control data of the other one broadcasting, both two distinct time-frequency resources; and emitting the first message comprising parameters identifying the time-frequency resources in the broadcasting group.

* * * * *